(12) United States Patent
Simon

(10) Patent No.: US 6,405,682 B1
(45) Date of Patent: Jun. 18, 2002

(54) ANIMAL TOY

(75) Inventor: Allen Simon, East Northport, NY (US)

(73) Assignee: Four Paws Products, Ltd., Hauppauge, NY (US)

(*) Notice: Subject to any disclaimer, the term of this patent is extended or adjusted under 35 U.S.C. 154(b) by 0 days.

(21) Appl. No.: 09/693,240

(22) Filed: Oct. 20, 2000

(51) Int. Cl.⁷ .............................................. A01K 29/00
(52) U.S. Cl. ........................ 119/707; 119/711; 446/168
(58) Field of Search ................................ 119/707, 702, 119/711; 446/168, 169, 241

(56) References Cited

U.S. PATENT DOCUMENTS

| | | | | |
|---|---|---|---|---|
| 1,150,761 A | * | 8/1915 | Hartman | 446/168 |
| 3,464,700 A | * | 9/1969 | Clatterbuck | |
| 3,502,335 A | * | 3/1970 | Sholin | |
| 4,722,299 A | * | 2/1988 | Mohr | 119/707 |
| 5,009,193 A | * | 4/1991 | Gordon | 119/711 |
| 5,785,005 A | * | 7/1998 | Udelle et al. | 119/706 |
| 5,809,938 A | * | 9/1998 | Baiera et al. | 119/707 |
| 5,875,736 A | * | 3/1999 | Udelle et al. | 119/706 |
| 5,924,908 A | * | 7/1999 | O'Heir | 446/168 |

* cited by examiner

Primary Examiner—Yvonne R. Abbott
(74) Attorney, Agent, or Firm—Darby & Darby

(57) ABSTRACT

An animal toy comprises a spherical housing including two annular tracks defining upper and lower polar regions and a ball retained in at least one of the circular tracks so that when an animal plays with the toy, the ball tends to move in the track. The housing includes a removable cap so that a material such as cat nip can be placed within the housing and holes in the housing so that the material can fall from the housing when the toy is played with by an animal.

3 Claims, 2 Drawing Sheets

ANIMAL TOY

This invention relates to a toy for domestic animals. The invention is particularly well suited for cats but can also be used with dogs and other small animals.

The invention provides a spherical toy in which one or two small balls are retained within circular tracks so that they can revolve around the sphere when the toy is propelled by a cat or dog.

SUMMARY OF THE INVENTION

Briefly, in accordance with the invention, a spherical housing is provided which includes upper and lower annular tracks. The two tracks divide the housing into opposite polar regions and a central equatorial region. The tracks are circular in cross section and a small ball is placed in one or both of the tracks. The diameter of the ball is such that the ball will rotate freely in its track but the ball will not fall out of the track when the housing is rotated, typically as an animal plays with it.

In a preferred embodiment, the housing includes a removable cap in at least one of the polar regions so that an animal "treat" can be placed in the housing. Holes may also be provided in one or both polar regions so that as the animal plays with the toy, the treats will fall from the housing through the various holes.

It is also contemplated that the small ball will have a removable cap so that an addition treat such as catnip can be placed within the ball. The ball may include small openings so that the cat can smell the catnip but the catnip is securely retained at all times with the ball.

THE DRAWINGS

DETAILED DESCRIPTION

Figure 1:
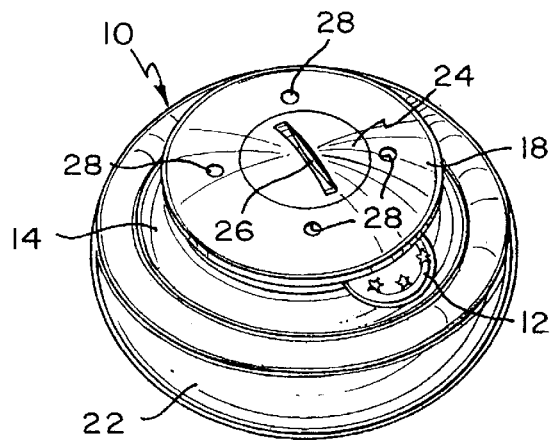
FIG. 1 is a top perspective view of a toy according to the invention.
Figure 2:
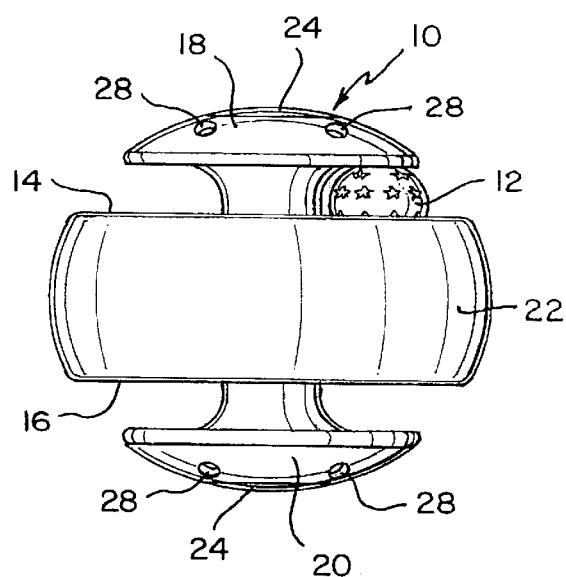
FIG. 2 is a side plan view of the toy.
Figure 3:
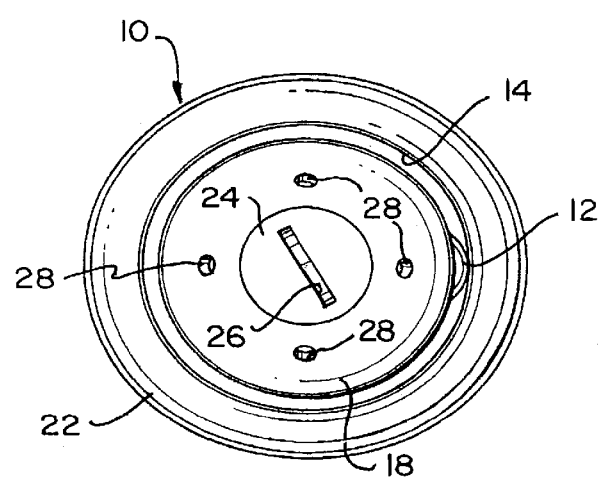
FIG. 3 is a top plan view of the toy.
Figure 4:
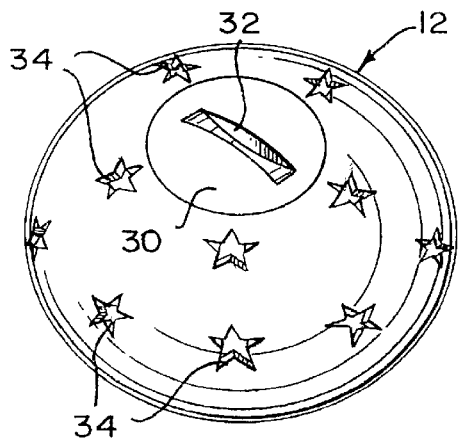
FIG. 4 is a top perspective view of a ball.
Figure 6:
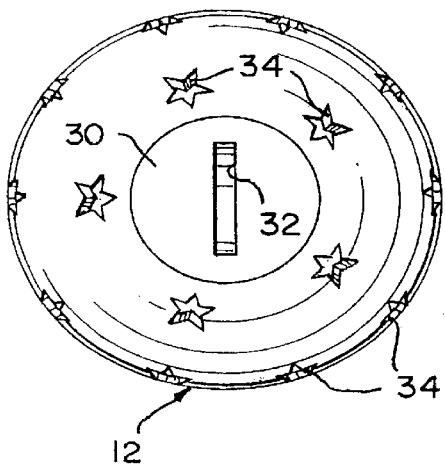
FIG. 6 is a top plan view of a ball.
Figure 5:
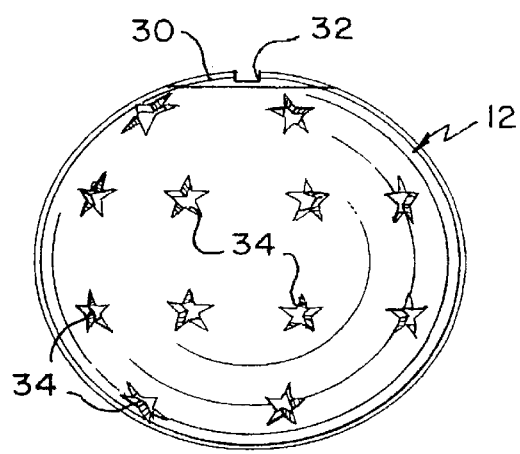
FIG. 5 is a side perspective view if a ball.
Figure 7:
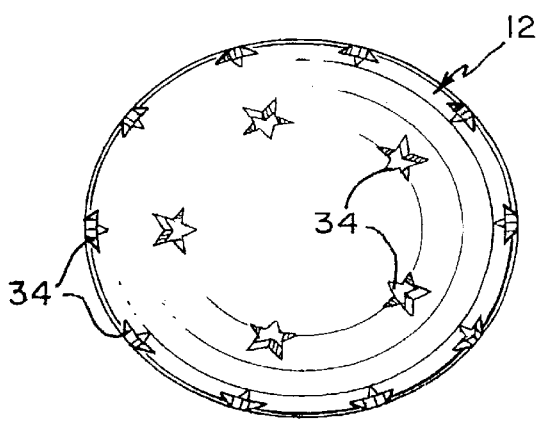
FIG. 7 is a bottom plan view of a ball.

Referring to the drawings, a toy in accordance with the invention comprises a generally spherical housing 10 and a small ball 12. One or two balls may be used. This spherical housing 10 includes upper and lower annular tracks 14 and 16, respectively. The tracks are generally circular in cross section and may be considered to divide housing 10 into upper and lower polar regions 18 and 20 and a central equatorial region 22.

The diameter of ball 12 should be such relative to the diameter of the tracks 14 and 16 that it will roll freely within the track when the housing is rolled, but will not fall from the track as the spherical housing is rolled across a floor.

One or both of the polar regions 18 and 20 includes a removable cap 24 which is threaded into the housing. Cap 24 includes an elongated slot 26 so that it can be removed by inserting a coin or the like into the slot and turning the coin. Four holes 28 are also provided in one or both polar regions 18 and 20. The intention is that small animal treats can be placed inside of the housing when cap 24 is removed and that when the animal plays with the housing causing it to rotate, the treats will spill from the openings 28.

The ball 12 also may include a removable cap 30 and a slot 32 so that it can be turned to thread it out of the ball. In this case, it is contemplated that catnip or the like would be introduced into the ball to attract the animal. A multiplicity of star shaped holes 34 are provided so that the animal can smell the catnip.

What is claimed is:

1. An animal toy, comprising a spherical housing having at least one annular track generally circular in cross section, a ball in said circular track so that when an animal plays with the toy, the ball tends to move in said track, a removable cap in said housing and holes in said housing so that material placed within said housing will fall through said holes when the animal plays with the toy.

2. An animal toy according to claim 1, wherein said housing includes two annular tracks defining upper and lower polar regions and a central equatorial region in the spherical housing.

3. An animal toy according to claim 1, wherein said ball includes a removable cap and a multiplicity of holes.

* * * * *